United States Patent [19]

Harwood et al.

[11] Patent Number: 4,656,712

[45] Date of Patent: * Apr. 14, 1987

[54] METHOD FOR MANUFACTURING A HEAT SHIELDED EXHAUST SYSTEM COMPONENT

[75] Inventors: Jon Harwood; Michael Clegg; Bruno A. Rosa; Walter G. Moring, all of Toledo, Ohio

[73] Assignee: AP Industries, Inc., Toledo, Ohio

[ * ] Notice: The portion of the term of this patent subsequent to Feb. 26, 2002 has been disclaimed.

[21] Appl. No.: 872,191

[22] Filed: Jun. 9, 1986

[51] Int. Cl.$^4$ .......................... B21D 53/00; F01P 1/08
[52] U.S. Cl. ..................... 29/157 R; 29/412; 29/416; 29/455 R; 29/463; 29/DIG. 13; 29/DIG. 48; 60/321; 138/113; 138/148; 138/178; 181/283; 228/170; 219/121 EK; 219/121 LM; 219/121 PH
[58] Field of Search ............. 29/157 R, 157 A, 157 T, 29/237, 282, 416, 455 R, 412, 463, DIG. 13, DIG. 48; 60/320, 321, 322; 138/111, 113, 114, 148, 178; 181/282, 283

[56] References Cited

U.S. PATENT DOCUMENTS

| | | | |
|---|---|---|---|
| 2,834,427 | 5/1958 | Powers et al. | 181/282 X |
| 3,396,813 | 8/1968 | Hall | 181/282 |
| 4,356,886 | 11/1982 | Daude et al. | 181/282 X |
| 4,501,302 | 2/1985 | Harwood | 138/113 |
| 4,590,652 | 5/1986 | Harwood | 29/157 R |

FOREIGN PATENT DOCUMENTS

| | | | |
|---|---|---|---|
| 25492 | 2/1979 | Japan | 219/121 LG |
| 14491 | 1/1982 | Japan | 219/121 LG |
| 119484 | 7/1983 | Japan | 219/121 LM |

*Primary Examiner*—Howard N. Goldberg
*Assistant Examiner*—Ronald S. Wallace
*Attorney, Agent, or Firm*—Anthony J. Casella; Gerald E. Hespos

[57] ABSTRACT

A method is provided for manufacturing a heat shield for an exhaust system component. The exhaust system component preferably is of tubular nonlinear configuration. The heat shield is formed from a larger pipe having an internal diameter greater than the outer diameter of the exhaust system component. Appropriately dimensioned inwardly directed supports are formed in the larger pipe. The larger pipe then is bent into a nonlinear configuration substantially identical to the configuration of the exhaust system component. The outer pipe then is cut longitudinally in half along its entire length to define a unitary nonlinear heat shield which can be mounted to the exhaust system component. A portion of the remaining half of the larger pipe can be reattached to the heat shield to provide an air gap pipe along a portion of the length of the exhaust system component.

17 Claims, 7 Drawing Figures

METHOD FOR MANUFACTURING A HEAT SHIELDED EXHAUST SYSTEM COMPONENT

BACKGROUND OF THE INVENTION

The exhaust system of a vehicle carries hot exhaust gases from the engine to a location on the vehicle where the gases may be safely and efficiently emitted. The engine typically is in the front of the vehicle, while the tail pipe typically terminates at or near the rear of the vehicle. The exhaust system must assume a very tortuous alignment along its length to avoid other structural components of the vehicle such as the passenger compartment, the rear axle, the fuel tank, the trunk, tire wells and such. An exhaust system is likely to include: a manifold which is mounted to the engine and which collects the hot exahust gases from several cylinders; an exhaust pipe which extends from the manifold; one or more mufflers connected to the exhaust pipe and operative to reduce the noises produced by the hot flowing exhaust gases; and a tail pipe extending from the muffler to the rear of the vehicle. Most vehicles also include a catalytic converter which is operative to chemically convert certain noxious gases into a less objectionable form.

In many instances, components of the exhaust system will pass in proximity to parts of the vehicle that may be sensitive to the heat generated by the exhaust system. In other situations, heated components of the exhaust system may be disposed where a potentially dangerous contact with objects external to the vehicle is possible.

In recent years, vehicular manufacturers have changed the engine and the exhaust system to effect more complete combustion of fuels and thereby to reduce certain pollutants. These engine operating changes typically are carried out by directing additional air into the engine or manifold. Although these engineering techniques are successful, they tend to significantly increase the temperature of exhaust gases with corresponding increases in the temperatures of the various exhaust system components. In certain situations, the hot exhaust pipes or tail pipes have been known to structurally damage adjacent parts of a vehicle. In other situations, exhaust system components have created a potential for fire in leaves or other debris that may directly contact an exhaust system component. Furthermore, the exhaust system components retain their heat for a considerable period of time and can burn people working on or near the vehicle.

Heat shields often are employed to separate a hot section of an exhaust system from an adjacent area that may be particularly sensitive to heat. The typical prior art heat shield has been stamp formed into a shape corresponding to the shape of the section of the exhaust system to be isolated. The heat shield then may be clamped or welded to a section of the exhaust system such that a gap is formed between the exhaust system and at least a portion of the heat shield. The gap between the exhaust system and the heat shield does not efficiently conduct heat. Consequently, the heat shield will be at a considerably lower temperature. Furthermore, the heat shield prevents physical contact with the adjacent hot portion of the exhaust system. One particularly effective heat shield is shown in U.S. Pat. No. 4,478,310 which issued to Donald P. Harter on Oct. 23, 1984, and which is assigned to the assignee of the subject invention. Although the heat shield shown in U.S. Pat. No. 4,478,310 is both effective and inexpensive, it cannot be adapted for the nonlinear tubular sections of an exhaust pipe or tail pipe. The prior art heat shields formed for such nonlinear tubular sections have been stamp formed and have covered very short sections of the exhaust system. Stamp formed heat shields require the initial costly investment in the dies to be used in forming the member. Because of these initial investments, stamp formed heat shields are extremely costly, and are virtually cost prohibitive on all but very large orders. Furthermore, even on extremely large orders, the shapes that are possible with the stamp forming equipment and processes are limited. In applications where a heat shield is required over a long circuitous section of an exhaust pipe or tail pipe, it has been found impractical to form a single nonlinear heat shield. Rather, the prior art typically would employ several short stamp formed heat shield sections mounted in series along a circuitous exhaust system component. This stamp forming has been found to be especially impractical where protection from heat must be applied to alternating sides of the exhaust pipe or tail pipe or where sections require protection on all sides.

Certain extemely hot tubular exhaust system components require protection on all sides along a considerable length of the exhaust system. In these situations, air gap pipes have been employed which comprise inner and outer tubular members with a generally annular air gap therebetween. A particularly effective air gap pipe and an efficient method for producing such a pipe is disclosed in U.S. Pat. No. 4,501,302 which issued to Jon W. Harwood on Feb. 26, 1985, and which is assigned to the assignee of the subject invention. The manufacturing method described in U.S. Pat. No. 4,501,302 involves the bending of selected inner and outer pipes into substantially identical nonlinear configurations. Appropriate supports are formed in or are attached to the inner or outer pipe to enable the desired radial separation therebetween. The outer pipe then is cut longitudinally in half by a programmed cutting apparatus. More particularly, the cutting apparatus is programmed to follow the precise circuitous shape of the outer pipe. The outer pipe halves then are separated and the inner pipe is positioned therebetween. The outer pipe halves may then be appropriately reconnected to achieve an air gap pipe. The air gap pipe, the method of producing the air gap pipe and an apparatus for performing the method are further described in co-pending U.S. patent application Ser. No. 790,737 which was filed on Oct. 24, 1985, and which is entitled "METHOD AND APPARATUS FOR FORMING AN AIR GAP PIPE." The disclosures of U.S. Pat. No. 4,501,302 and of application Ser. No. 790,737 are incorporated herein by reference.

Despite the many advantages of the air gap pipe described in the above identified references, the prior art has not included a technique for efficiently, quickly, and inexpensively manufacturing heat shields, and particularly heat shields for nonlinear sections of exhaust pipes or tail pipes. Although the air gap pipe shown in U.S. Pat. No. 4,501,302 provides exceptional protection from heat, it often is necessary to protect only one side of the exhaust or tail pipe along certain sections of its length. Thus, the air gap pipe would utilize substantially twice as much material as might be required for these sections. Furthermore, on other sections of an exhaust or tail pipe, an air gap pipe may be less desirable than a heat shield. Specifically, it may be preferable to provide a heat shield on one side of a pipe while allowing a continuous flow of cooling air adjacent the other side. In still other situations, it may be desirable to mix heat shields with an air gap construction at various sections along the length of an exhaust system. Furthermore, it may be desirable to alternate the sides on which the heat shield is located in accordance with the vehicle specifications.

In view of the above, it is an object of the subject invention to provide an efficient method for producing a heat shield for a tubular member of a vehicular exhaust system.

It is another object of the subject invention to provide an efficient method for producing a nonlinear heat shield for a tubular member.

Another object of the subject invention is to provide a method for producing a hybrid exhaust system having both heat shields and air gap pipes along selected portions of the exhaust system.

Still another object of the subject invention is to provide a heat shield of unitary construction extending along substantially the entire length of a nonlinear tubular member.

A further object of the subject invention is to provide a method for producing a heat shielded tubular member that can accommodate differential expansion.

SUMMARY OF THE INVENTION

The subject invention is directed to a method for producing a heat shield for a tubular member. Typically, the tubular member would be an exhaust pipe or a tail pipe of a vehicular exhaust system. It also would be typical that the exhaust pipe or tail pipe and the associated heat shield would be an elongated nonlinear structure. In most instances, the exhaust pipe or tail pipe and the associated heat shield would include a plurality of bends about nonparallel axes such that the resulting structure would not lie in a single plane.

The process of the subject invention includes the first step of selecting a first pipe having a cross-sectional size and a length suitable for accommodating the volume of exhaust gases for the particular vehicle. This first pipe will function as either the exhaust pipe or tail pipe of the vehicle, as explained further below.

The process next includes the step of selecting a second pipe having a cross-sectional dimension greater than the first pipe. More particularly, the inside diameter of the second pipe will be greater than the outside diameter of the first pipe such that the first pipe could be nested within the second pipe with an air gap therebetween. The second pipe may be shorter than, as long as or slightly longer than the first pipe depending upon the particular heat insulating needs of the vehicle.

The process next includes the step of bending both the first and second pipes into substantially identical nonlinear configurations to accommodate the space availability and design requirements of the vehicle.

The next step of the process includes forming appropriate supports on either the first or second pipe. The supports may be in the form of legs mounted to the first pipe or in the form of inward deformations created in the second pipe. The deformations may be dimples formed in the second pipe or spring fingers cut therein. Preferably, the supports are resilient to accommodate differential movements caused by vibrations, heat expansion or the like.

The process further includes the step of cutting the bent second pipe longitudinally in half. Preferably, the cutting of the second pipe is accomplished by a preprogrammed cutting apparatus. It also is preferred that the cutting apparatus employ an efficient high energy cutting means such as a plasma arc cutting apparatus or a laser cutting apparatus. A particularly preferred cutting apparatus is described in detail in the co-pending application Ser. No. 790,737. That particular cutting apparatus employs a pair of plasma arc cutters mounted to robotic devices that are programmed to follow the precise shape of the bent second pipe. One cutter is adapted to cut through the second pipe along one longitudinal side, while the other cutter is adapted to cut the second pipe along the opposed longitudinal side. The system described in application Ser. No. 790,737 further employs a follower means on each cutter to insure that the high energy cutters are precisely aligned at diametrically opposed locations along the center of the pipes. The cutter apparatus may further include a shuttle system for efficiently feeding outer pipes into position to be cut.

The cut second pipe produces two longitudinal pipe halves either of which can be mounted to the first pipe to provide a heat shield extending along the entire nonlinear length of the first pipe. Either of these halves can be used in accordance with the particular heat insulating requirements of the vehicle. The specific requirements may call for using sections of one or the other longitudinal half of the second pipe at selected locations along the entire length of the first pipe. Furthermore, certain sections of the first pipe may require heat insulation on both sides. In view of these various possible design requirements, one or both longitudinal halves of the second pipe may have to be cut at selected locations along their respective lengths.

Sections of one or both longitudinal halves next are securely mounted to the first pipe at locations that will achieve the desired heat insulation. The mounting of appropriate portions of the second pipe to the first pipe may be carried out by appropriate clamping means such as U-bolts or straps. The second pipe may be appropriately deformed to more securely accommodate this clamping means. The segments of the second pipe halves that are mounted to the first pipe may further be reduced adjacent their opposed ends. This reduction will further facilitate the secure attachment of the second pipe half to the first pipe. For example, the reduction of the second pipe half adjacent its end will enable a secure welding between the second pipe half and the first pipe. Furthermore, in certain situations it may be desirable to achieve a mechanical interconnection between the first pipe and the end of the second pipe half. This may be accomplished by folding part of the second pipe half end into the first pipe end.

The structure produced by the process of the subject invention comprises a nonlinear pipe for carrying exhaust gases and one or more unitary heat shields which follow the nonlinear exhaust pipe or tail pipe along at least a portion of its length. In most situations, the heat shield will extend along substantially the entire nonlinear length of the exhaust or tail pipe. In this typical situation, the opposed longitudinal half of the second pipe will become scrap that can be sold or refabricated for appropriate alternate uses. The resale value of this unused portion of the second pipe will be less than the initial value of the pipe by an amount which reflects the manufacturing cost of converting a flat metal member into a tubular metal member. Even when this lost cost is considered, the resulting process is substantially less expensive than the total cost for manufacturing a comparable heat shield or array of heat shields by the prior art stamp forming methods. Furthermore, the subject process has several functional advantages over the prior art stamp forming processes. Specifically, the process of the subject invention can accommodate major design changes with little or no retooling. Rather, the coordinates of the new exhaust system components need merely be entered into the control system for the programmed cutting apparatus. Thus, the subject process is well suited for application to both large and small orders. Additionally, the subject process easily provides a unitary heat shield along a complex array of bends. This is functionally far superior to the several short interconnected heat shields that were required by prior art processes. The subject process further enables the incorporation of short sections of air gas pipe into a long unitary heat shield.

DETAILED DESCRIPTION OF THE PREFERRED EMBODIMENTS

Figure 1:
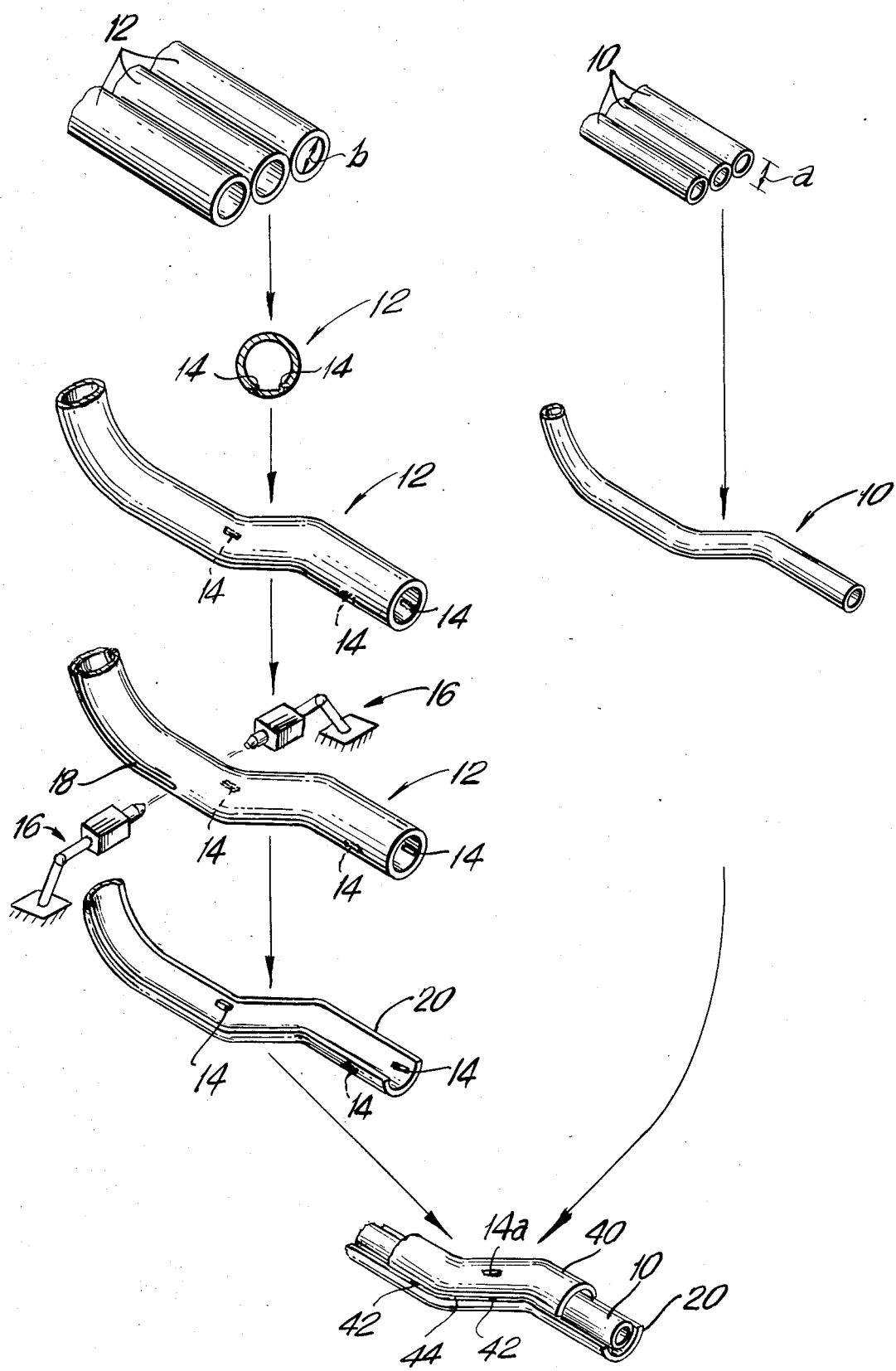
FIG. 1 is a schematic illustration of the process of the subject invention.

The process for producing a heat shielded exhaust system component is illustrated schematically in FIG. 1. The process shown in FIG. 1 includes the steps of providing a supply of first pipes 10 and a supply of second pipes 12. Each first pipe has an outside diameter "a" which is selected to insure compatibility with the requirements of a particular vehicle exhaust system. In most instances, each first pipe 10 will have an outside diameter "a" of between approximately 2 inches and 4 inches, however larger or smaller first pipes 10 are possible (e.g., 1 inch to 10 inches).

Each second pipe 12 will have an inside diameter "b" which is greater than the outside diameter "a" of the corresponding first pipe 10. The difference between the outside diameter "a" of first pipe 10 and the inside diameter "b" of the second pipe 12 is great enough to provide a generally annular air gap if a first pipe 10 were to be inserted into a second pipe 12.

The process next includes the step of forming inwardly directed supports 14 in each second pipe 12. Each support 14 preferably defines a dimple which extends inwardly a distance approximately equal to one-half the difference between dimensions "b" and "a". The supports 14 preferably are disposed generally around one circumferential half of the second pipe 12. Furthermore, the supports 14 will be disposed at spaced apart locations along the second pipe 14.

The first pipes 10 and second pipes 12 then are bent into appropriate nonlinear configurations to conform to the design requirements of the vehicle. This bending is carried out such that the first pipe 10 and the second pipe 12 will have substantially identical bent configurations. The bending preferably is carried out on a programmable bender. For most vehicles, each first pipe 10 and second pipe 12 receives a plurality of bends which lie in intersecting planes, as shown in FIG. 1.

The bent second pipe 12 then is advanced to a cutting apparatus 16 which is operative to cut the bent outer pipe 12 longitudinally in half. Preferably, a pair of programmable cutters 16 are employed to create a pair of longitudinal cuts 18 along the bent outer pipe 12. The cutters 16 are programmed to follow generally diametrically opposed locations along the length of the bent second pipe 12. However, it is preferred that the programmable cutters 16 be slightly offset from one another in a longitudinal direction such that the cutters do not directly interfere with one another. Preferably, each cutter 16 is a high energy cutter, such as a plasma arc cutter or a laser cutter. Cutters of this type have been found to quickly and efficiently yield a high quality cut that does not require subsequent finishing or machining steps. Preferably, the cutting apparatus 16 will include a follower means as described in detail in the co-pending application Ser. No. 790,737. The follower means enables the substantially precise following of the centerline of the bent second pipe 12 by each cutting apparatus 16. The follower means enables substantially diametrically opposed cuts to be formed in the bent second pipe 12. Although the cutting apparatus 16 will typically perform only longitudinal cuts, it can be programmed to effect other cuts as needed, such as radial cuts or the creation of notches or holes in the second pipe 12. Such notches or holes may be required to clear an obstacle or to alter the flow of air around the pipe.

Figure 2:
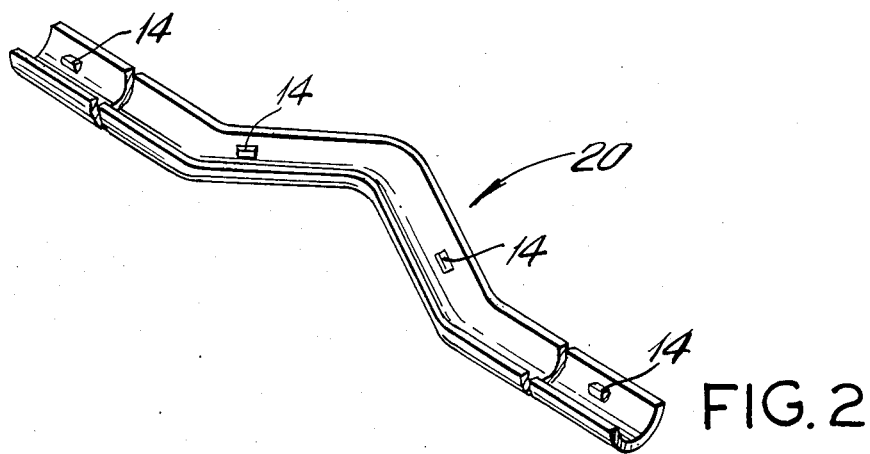
FIG. 2 is a perspective view of the heat shield formed in accordance with the subject invention.

The complete longitudinal passes of the cutters 16 along the bent second pipe 12 enable the bent second pipe 12 to be separated into longitudinal halves. A selected longitudinal half will define heat shield 20 as shown schematically in FIG. 1 and in greater detail in FIG. 2. In most situations, the remaining longitudinal half of the bent second pipe 12 will not be required for use on the vehicle, and therefore will be used for scrap. In other situations, as explained further below, portions of the remaining longitudinal half of the bent second pipe 12 may be employed on the vehicle.

Figures 3, 4:
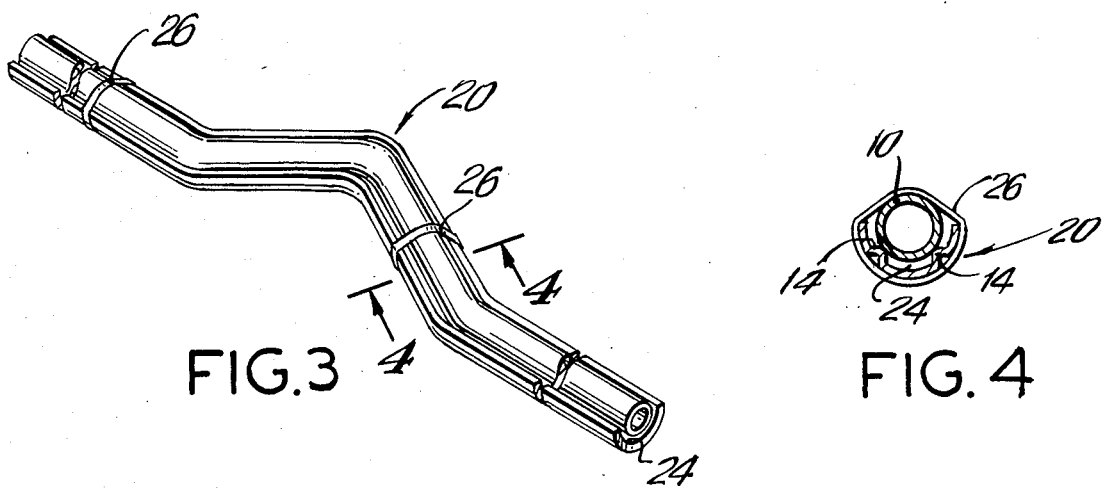
FIG. 3 is a perspective view of a combined pipe and heat shield of the subject invention.
FIG. 4 is a cross-sectional view taken along line 4—4 of FIG. 3.

As shown in FIGS. 3 and 4, the bent first pipe 10 then is placed within the heat shield 20 to rest upon the supports 14. More particularly, the supports 14 insure that the bent first pipe 10 is generally radially spaced from the heat shield 20 such that a generally semiannular air gap 24 exists between the bent first pipe 10 and the heat shield 20. The semiannular air gap 24 provides a heat insulation which enables the heat shield 20 to remain at a lower temperature than the bent pipe 10. Additionally, the heat shield 20 physically insures that the bent pipe 10 will not directly contact any adjacent surfaces on or near the vehicle which may be sensitive to the high temperatures occasionally achieved by the pipe 10. The bent first pipe 10 is securely retained in proximity to the heat shield 20 by clamps 26. A shown in FIGS. 3 and 4, the clamps 26 may define straps that are wrapped around the seated first pipe 10 and heat shield 20. Alternatively, appropriate U bolts and clamping members may also be employed.

Figure 5:
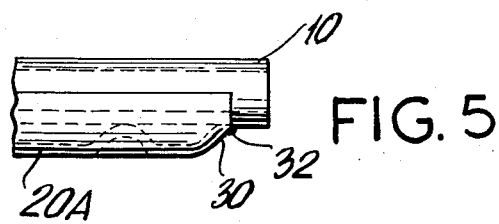
FIG. 5 is a front elevational view of a second embodiment of the heat shield and pipe combination of the subject invention.
Figure 6:
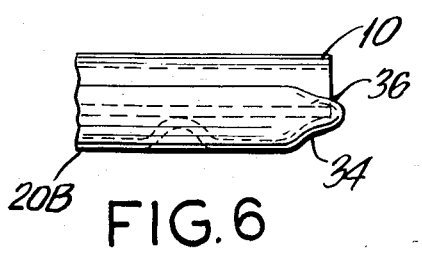
FIG. 6 is a front elevational view of a third embodiment of a heat shield and pipe combination in accordance with the subject invention.
Figure 7:
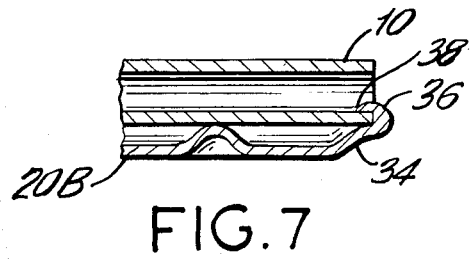
FIG. 7 is a cross-sectional view of the embodiment of the heat shield and pipe combination illustrated in FIG. 6.

To insure proper support of the first pipe 10 in the heat shield 20, the opposed ends of the heat shield 20 may be appropriately reduced in size to mount adjacent the pipe 10. As shown in FIG. 5, a heat shield 20A is provided with an inwardly directed flange 30 at one end thereof. The flange 30 is unitary with the heat shield 20A and is formed by mechanically urging an end of the heat shield 20A inwardly a sufficient amount to abut the outer circumferential surface of the bent first pipe 10. The connection of the heat shield 20A to the first pipe 10 may be further secured by welding the flange 30 to pipe 10 at location 32. FIGS. 6 and 7 show a heat shield 20B having an alternate mounting to the first pipe 10. More particularly, the heat shield 20B is provided with an inwardly directed flange 34 which includes a connecting portion 36 that is folded into the bent pipe 10. The inwardly folded portion 36 is urged into engagement with the inner circumferential surface of the pipe 10, while the adjacent outwardly disposed portion of the flange 34 is urged into engagement with the outer circumferential surface of pipe 10. This mechanical engagement of the heat shield 20B with the pipe 10 may be further enhanced by an appropriate weldment 38.

As noted above, certain vehicles will require a local section of air gap pipe in addition to a more extensive section of heat shield. This can be accomplished as shown in FIG. 1 by retaining a portion of the otherwise unused longitudinal half of the bent second pipe 12. This portion may be trimmed to one or more appropriate lengths 40 which correspond to the location along the first pipe 10 that requires the additional heat insulation. This section 40 will be of an appropriate bent shape to match with the corresponding location on the bent first pipe 10 because, as explained in detail above, both the first and second pipes 10 and 12 were formed into substantially identical nonlinear configurations reflecting the design requirements of the vehicle. In this embodiment of the invention, the first pipe 10 will be placed appropriately within the heat shield 20. The section 40 will then be positioned at its corresponding location relative to both the pipe 10 and the heat shield 20 for achieving the required heat insulation. The section 40 will then be secured relative to the heat shield 20 by spaced apart weldments 42 or other mechanical connections. In this manner, small spaced apart ventilation slits 44 may be disposed between adjacent weldments 42.

In summary, a process is provided for forming a heat shield for a tubular exhaust system member. The tubular exhaust system member typically will be of nonlinear configuration and will bend through a plurality of intersecting planes. The heat shield is manufactured by providing a pipe having an inside diameter which is greater than the outside diameter of the tubular exhaust system member. An array of inwardly extending supports then are formed along a selected longitudinal half of this larger pipe. The larger pipe then is bent into a nonlinear configuration that is substantially identical to the nonlinear configuration of the tubular exhaust system component. The larger pipe then is cut longitudinally in half along its entire length to provide a heat shield of generally semicircular configuration that can extend longitudinally along the entire length of the exhaust system component. The heat shield is maintained at a selected distance from the exhaust system component by the supports formed therein. The heat shield then is attached to the exhaust system component by clamps, brackets or the like. Opposed ends of the heat shield may be reduced in dimension for secure mounting adjacent to the exhaust system component. The longitudinal half of the larger pipe that is not used as the heat shield may be recycled as appropriate. Alternatively, a portion of the other longitudinal half of the larger pipe may be reattached to the corresponding portion of the heat shield to form a short section of air gap pipe along the length of the heat shielded exhaust system component.

While the invention has been described relative to certain preferred embodiments, it is obvious that various modifications thereto can be made without departing from the scope of the invention as defined by the appended claims.

What is claimed is:

1. A process for manufacturing a heat shield for insulating one longitudinal half of an elongated nonlinear tubular exhaust system component, said process comprising:
   selecting an elongated tubular member of generally circular cross section having opposed inner and outer surfaces, the inner surface thereof defining a diameter which exceeds the maximum outer dimension of the exhaust component;
   bending the tubular member into a nonlinear configuration substantially identical to the nonlinear configuration of the exhaust system component;
   cutting the tubular member longitudinally in half along its entire nonlinear length; and
   mounting a selected longitudinal half of the tubular member in generally spaced relationship to the exhaust system component such that the opposed longitudinal half of the exhaust system component is substantially uninsulated, thereby achieving a directionally controlled dissipation of heat from said exhaust system component.

2. A process as in claim 1 further comprising the step of forming a plurality of inwardly directed supports in the tubular member prior to mounting the selected longitudinal half of the tubular member to the exhaust system component, whereby the inwardly directed supports achieve the spaced relationship between the tubular member and the exhaust system component.

3. A process as in claim 2 wherein the supports are formed at spaced apart locations along the tubular member and in a portion thereof corresponding to the longitudinal half thereof to be selected for mounting on the exhaust system component.

4. A process as in claim 2 wherein the tubular member is cut longitudinally by a preprogrammed cutting apparatus which is operative to follow the nonlinear shape of the tubular member.

5. A process as in claim 4 wherein the cutting apparatus comprises a plasma arc cutter.

6. A process as in claim 4 wherein the cutting apparatus comprises a laser cutter.

7. A process as in claim 2 further comprising the step of reducing the cross-sectional dimension of said tubular member adjacent the opposed ends thereof.

8. A process as in claim 2 wherein the step of forming supports in the tubular member comprises the step of forming inwardly directed resilient dimples therein, said dimples being dimensioned to enable a selected gap to exist between the heat shield and the exhaust system component.

9. A process as in claim 2 further comprising the step of reducing at least portions of the cross-sectional dimension of the opposed ends of at least one longitudinal half of the second tubular member to enable the opposed ends of said longitudinal half to engage the first tubular member.

10. A process as in claim 9 further comprising the step of attaching the dimensionally reduced cross-sectional portions of the opposed ends of to the first tubular member.

11. A process as in claim 10 wherein the dimensionally reduced cross-sectional portions of the opposed ends are attached to the first tubular member by welding.

12. A process as in claim 10 wherein at least a portion of at least one opposed end of said longitudinal halves is mechanically engaged with the corresponding end of said first tubular member.

13. A process as in claim 12 wherein the mechanical engagement comprises the step of folding a portion of at least one said end of said selected longitudinal half into the corresponding end of the first tubular member.

14. A process for forming a heat shielded exhaust system component, said process comprising the steps of:
    selecting first and second elongated tubular members, the second tubular member having an inner cross-sectional dimension which exceeds the outer cross-sectional dimension of the first tubular member;
    bending the first and second tubular members into substantially identical nonlinear configurations;
    cutting the second tubular member longitudinally in half to define two elongated nonlinear members of generally semi-circular cross section;
    cutting at least one longitudial half of said second, tubular member at at least one location along its length;
    attaching selected portions of both longtudinal halves of the second tubular member together and at least partly around and generally spaced from first tubular member to define a heat shielded exhaust system component wherein selected longitudinally extending portions on at least one side have no heat shield.

15. A process as in claim 14 further comprising the step of forming inwardly directed supports at spaced apart locations along the second tubular member, said supports extending inwardly a distance sufficient to enable the first tubular member to be supported thereon within the second tubular member.

16. A process as in claim 15 wherein only one longitudinal half of said second tubular member is cut at at least one location along its length.

17. A process as in claim 15 wherein said first and second tubular members are bent through a plurality of angularly aligned planes.

* * * * *